United States Patent [19]

Ishikawa

[11] Patent Number: 5,364,203
[45] Date of Patent: Nov. 15, 1994

[54] BUS BAR CONNECTING DEVICE

[75] Inventor: Masahiro Ishikawa, Marugame, Japan

[73] Assignee: Mitsubishi Denki Kabushiki Kaisha, Tokyo, Japan

[21] Appl. No.: 6,757

[22] Filed: Jan. 21, 1993

[30] Foreign Application Priority Data

Jan. 24, 1992 [JP] Japan .................................. 4-011064

[51] Int. Cl.$^5$ .............................................. F16B 7/18
[52] U.S. Cl. .................................... 403/403; 403/394;
403/405.1; 403/396; 174/71 B; 24/335
[58] Field of Search ............... 403/403, 205, 396, 395,
403/405.1, 406.1, 394, 400, 388, 384, 385;
24/335, 514, 569; 411/169, 166; 174/94 R, 94 S,
71 B, 72 B, 88 B

[56] References Cited

U.S. PATENT DOCUMENTS

| 628,297 | 7/1899 | Barr | 411/166 |
|---|---|---|---|
| 2,175,453 | 10/1939 | Barcy | 403/405 |
| 2,767,951 | 10/1956 | Cousino | 403/400 X |
| 3,157,001 | 11/1964 | Vail | 403/400 X |
| 3,303,293 | 2/1967 | Howell, Jr. | 174/88 B X |
| 3,380,786 | 4/1968 | Petersen | 403/395 X |
| 3,398,981 | 8/1968 | Vincens | 403/405.1 |
| 3,509,514 | 4/1970 | Christensen et al. | 174/72 B X |
| 4,048,059 | 9/1977 | Evans | 403/405.1 X |
| 4,408,928 | 10/1983 | Steinke | 403/405.1 |

FOREIGN PATENT DOCUMENTS

| 2061680 | 6/1972 | Germany | 174/72 B |
|---|---|---|---|
| 2224068 | 4/1990 | United Kingdom | 403/405.1 |

Primary Examiner—Randolph A. Reese
Assistant Examiner—Harry C. Kim
Attorney, Agent, or Firm—Burns, Doane, Swecker & Mathis

[57] ABSTRACT

A bus bar connecting device according to the invention comprises a clamper for clamping first and second bus bars disposed to extend at an angle with each other. The clamper is preferably electrically conductive to permit passage of an electric current therethrough. The second bus bar may have a hole, and a bolt extends through the clamper and the hole of the second bus bar, and screwed into a nut provided on the opposite side of the second bus bar. As the bolt is screwed into the nut, the clamper is pressed against the bus bars, and also presses the first and second bus bars against each other. Preferably, the clamper has linear protrusions at which it is in contact with the bus bars. Because of the pressure contact along the entire linear protrusions, the area of contact is larger than if the contact is made only at a point. The device is provided with a mechanism to prevent shift of the second bus bar in the lateral direction of the first bus bar. Such a mechanism may consist of a step of the clamper. Such a mechanism may additionally consist of a bent end of the second bus bar or a protrusion provided on the second bus bar. Such a mechanism may alternatively be in the form of an elongated dent or groove provided on the first bus bar with which one of the linear protrusions of the clamper is engaged.

17 Claims, 4 Drawing Sheets

BUS BAR CONNECTING DEVICE

BACKGROUND OF THE INVENTION

The present invention relates to a bus bar connecting device used for instance in a switchboard.

FIG. 8 shows a conventional bus bar connecting device. As illustrated, a main bus bar 11 extending vertically, and a branch bus bar 12 extending horizontally are connected by means of a bolt 4, a nut 5 and a washer 6, with the bolt 4 extending through holes in the bus bars 11 and 12. The bolt 4 and the nut 5 are screwed with each other and tightened with a predetermined torque to press the bus bars 11 and 12 against each other.

A problem associated with the conventional bus bar connecting device is that it is necessary to provide a hole in both of the bus bars 11 and 12. When for instance a new horizontal bus bar is added to an existing switchboard for connection with a vertical bus bar, it is necessary to remove the vertical bus bar from the switchboard and then machine the vertical bus bar to form a hole. Such work for remodeling or modification is time consuming.

SUMMARY OF THE INVENTION

An object of the invention is to facilitate addition of a new bus bar to an existing switchboard.

A bus bar connecting device according to the invention comprises a clamper for clamping first and second bus bars disposed to extend at an angle with each other. Preferably, the clamper is electrically conductive to permit passage of an electric current therethrough, and has linear protrusions at which it is in contact with the bus bars. The second bus bar may have a hole, and a bolt extends through said the clamper and said hole of the second bus bar and screwed into a nut provided on the opposite side of said second bus bar. As the bolt is screwed into the nut, the clamper is pressed against the bus bars, and also presses the first and second bus bars against each other. Means may be provided to prevent shift of the second bus bar in the lateral direction of the first bus bar. Such means may comprise a step of the clamper. Such means may additionally comprise a bent end of The second bus bar or a profusion provided on the second bus bar. Such means may alternatively be in the form of an elongated dent or groove provided on the first bus bar with which a linear protrusion provided on the clamper is engaged.

DETAILED DESCRIPTION OF THE PREFERRED EMBODIMENTS

Figure 1:
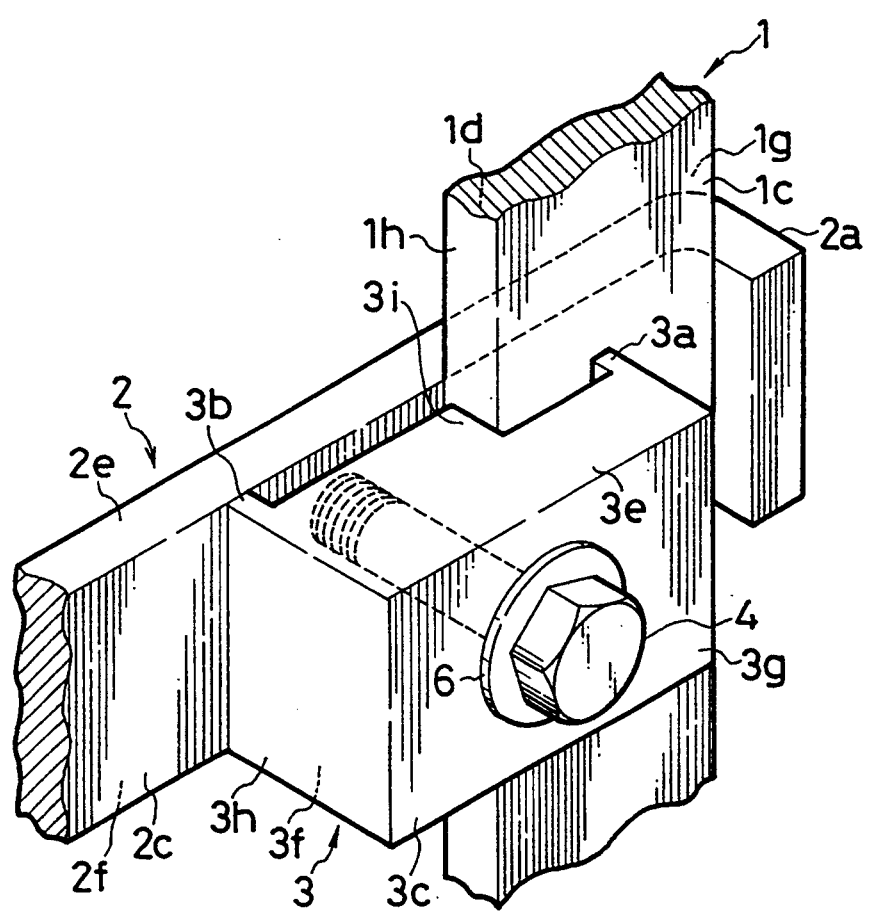
FIG. 1 is a perspective view showing a bus bar connecting device of an embodiment of the invention.
Figure 2:
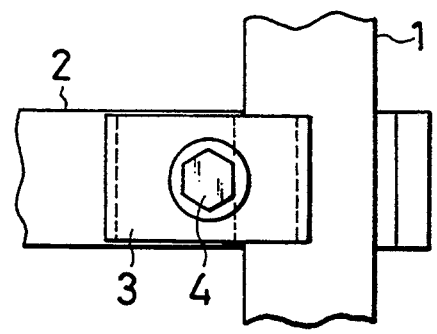
FIG. 2 is a front view showing the bus bar connecting device of the embodiment of FIG. 1.
Figure 3:
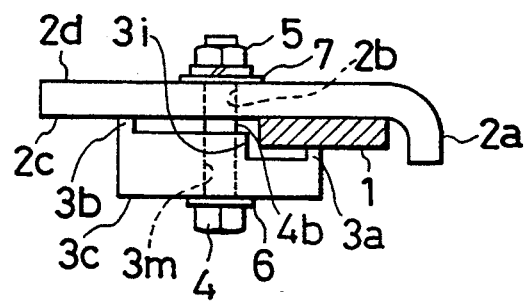
FIG. 3 is a plan view showing the bus bar connecting device of the embodiment of FIG. 1.
Figure 4:
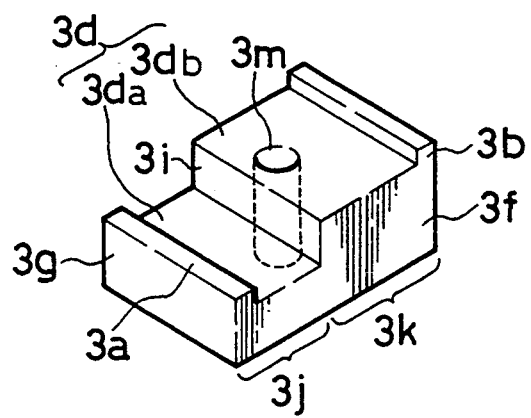
FIG. 4 is a perspective view showing a clamper forming the bus bar connecting device of FIG. 1.

An embodiment of the invention will now be described with reference to FIG. 1 to FIG. 4.

The bus bar connecting device of this embodiment is for connecting a main bus bar 1 in the form of a beam or strip extending substantially vertically and a branch bus bar 2 in the form of a beam or strip extending substantially horizontally. The rear surface $1d$ of the vertical bus bar 1 is in contact with the front surface $2c$ of the horizontal bus bar 2. The horizontal bus bar 2 has a bent end $2a$, bent forward to form an L-shaped end as seen from the above, to engage with a first side surface $1g$ of the vertical bus bar 1. The horizontal bus bar 2 also has a hole $2b$ (FIG. 3) near the bent end $2a$. The hole $2b$ is for insertion of a bolt 4 to be described later. The horizontal bus bar 2 is disposed so that its bent end $2a$ and hole $2b$ are adjacent to the first side surface $1g$ and a second side surface $1h$ of the vertical bus bar 1, opposite to the first side surface $1g$ respectively.

A clamper 3 is made of an electrically conducting material, such as copper or a copper alloy, and is generally in the form of a rectangular block having a front surface $3c$, a stepped rear surface $3d$, a top surface $3e$, a bottom surface $3f$, a first side surface $3g$ and a second side surface $3h$. The top and bottom surfaces $3e$ and $3f$ of the clamper 3 extend parallel with and are aligned with top and bottom surfaces $2e$ and $2f$ of the horizontal bus bar 2. The first and second side surfaces $3g$ and $3h$ of the clamper 3 extend parallel with the first and second side surfaces $1g$ and $1h$ of the vertical bus bar 1. The stepped rear surface $3d$ has a step $3i$ in engagement with the second side surface $1h$ of the vertical bus bar 1. Because of the step $3i$, a first part $3da$ of the rear surface $3d$ is closer to the front surface $3c$ than a second part $3db$ of the rear surface $3d$. As a result, the clamper 3 has a thin part $3j$ defined by the first part $3da$ of the rear surface $3d$ and the front surface $3c$, and a thick part $3k$ defined by the second part $3db$ of the rear part $3d$ and the front surface $3c$.

A first linear protrusion $3a$ is provided at the edge formed by the first side surface $3g$ and the first part $3da$ of the rear surface $3d$ and protrudes rearward. A second linear protrusion $3b$ is provided at the edge formed by the second side surface $3h$ and the second part $3db$ of the rear surface $3d$ and protrudes rearward. The first linear protrusion $3a$ is in contact with the front surface $1c$ of the vertical bus bar 1. The second linear protrusion $3b$ is in contact with the front surface $2c$ of the horizontal bus bar 2.

The clamper 3 is provided with a hole $3m$ (FIG. 3) aligned with the hole $2b$ of the horizontal bus bar 2. The bolt 4 is inserted from the front side through the holes $3m$ and $2b$ and screwed into a nut 5 provided on a rear surface $2d$ of the horizontal bus bar 2. More specifically, a head $4a$ of the bolt 4 is on the front surface $3c$ of the clamper 3, with a washer 6 being inserted between the head $4a$ and the front surface $3c$. A shank $4b$ having a thread portion extends through the holes $3m$ and $2b$, with a free or rear end of the shank $4b$ extending out of the rear surface $2d$ of the horizontal bus bar 2, and screwed into the nut 5. Another washer 7 is also provided between the nut 5 and the rear surface $2d$ of the horizontal bus bar 2.

As the bolt 4 and the nut 5 are tightened, the linear protrusions $3a$ and $3b$ of the clamper 3 are pressed against the vertical and horizontal bus bars 1 and 2, and the vertical bus bar 1 and the horizontal bus bar 2 are pressed against each other. The contact between the linear protrusions 3a and 3b and the vertical and horizontal bus bars 1 and 2 are over linear areas, so that the contact pressure can made high, and the current capacity can be made large. Moreover, the area of contact is larger than if the contact is only at a point, so a sufficient current capacity is obtained.

With the above described arrangement, shift of the horizontal bus bar 2 in the lateral direction of the vertical bus bar 1 is prevented or restricted by engagement of the bent end 2a and the step 3i of the clamper 3 with the side surfaces 1g and 1h, respectively of the vertical bus bar 1. More specifically, shift of the horizontal bus bar 2 in the lateral direction of the vertical bus bar 1 is limited to the range permitted by the clearance between the separation between the bent end 2a and the step 3c, and the width of the vertical bus bar 1, and shift beyond such range is prevented.

For assembly, the vertical bus bar 1 may first be fixed in position. Then the horizontal bus bar 2 is brought from the rear side into contact with the vertical bus bar 1, in such a manner that the front surface 2c of the horizontal bus bar 2 is in contact with the rear surface 1d of the vertical bus bar 1, and that the hole 2b and the bent end 2a are adjacent to the first and second sled surfaces 1g and 1h of the vertical bus bar 1. The clamper 3 is then brought from the front side into contact with the horizontal bus bar 2 and the vertical bus bar 1. The bolt 4 is then inserted from the front side through the holes 3m and 2b, and while the nut 5 is placed on the rear surface 2d of the horizontal bus bar 2, in alignment with the hole 2b, and the bolt 4 is screwed into the nut 5. The washers 6 and 7 are placed as the bolt 4 is inserted. The bolt 4 and the nut 5 are tightened with a predetermined torque to give a predetermined pressure at the interfaces where the linear protrusions 3a and 3b of the clamper 3 are in contact with the vertical and horizontal bus bars 1 and 2.

The hole 2b in the horizontal bus bar 2 may be provided prior to the assembly, i.e., prior to bringing the horizontal bus bar 2 into contact with the vertical bus bar 1. It is not necessary to form a hole in the vertical bus bar 1. For this reason, subsequent addition of a horizontal bus bar 2 is easy, and does not require the vertical bus bar 1 to be removed for machining or processing.

Figure 5:
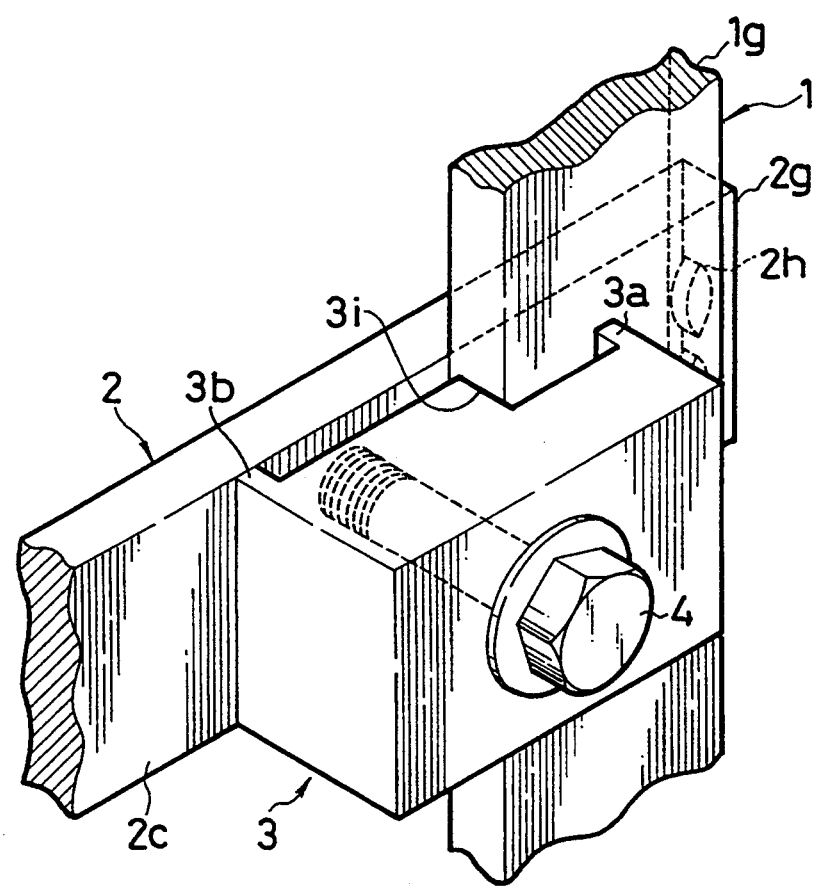
FIG. 5 is a perspective view showing a bus bar connecting device of another embodiment of the invention.

In the embodiment described above, the horizontal bus bar 2 is provided with a bent end 2a, which engages with the first side surface 1g of the vertical bus bar 1, thereby to prevent shift of the horizontal bus bar 2 in the lateral direction of the vertical bus bar 1. In place of the bent end 2a, some other means to engage with the first side surface 1g may be used. For instance, a protrusion 2h, shown in FIG. 5, may be provided on the front surface 2c, near the end 2g of the horizontal bus bar 2, such that the hole 2b and the protrusion 2h are adjacent to opposite side surfaces 1g and 1h of the vertical bus bar 1.

Figure 6:
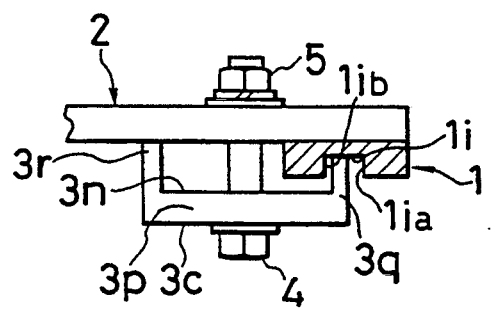
FIG. 6 is a plan view showing a bus bar connecting device of a further embodiment of the invention.

FIG. 6 shows another arrangement for preventing the shift of the horizontal bus bar 2 in the lateral direction of the vertical bus bar 1. In the illustrated structure, the clamper 3 does not have the stepped rear surface, but the rear surface 3n is flat, so that the clamper 3 comprises a flat part 3p of a uniform thickness defined by the flat front surface 3c and the flat rear surface 3n, and first and second blades 3q and 3r extending from first and second edges of the flat part 3p of the clamper 3. The rear ends of the blades 3q and 3r form linear protrusions. The vertical bus bar 1 has an extended dent or groove 1i provided on the front surface 1c and extending in the vertical direction to receive the rear end of the first blade 3q. In other words, the rear end of the first blade 3q is inserted in the groove 1i and engaged with the groove 1i. With this arrangement, shift of the horizontal bus bar 2 in the lateral direction of time vertical bus bar 1 is prevented or restricted by engagement of the blade 31 with side walls 1ia and 1iib of the groove 1i. More specifically, shift of the horizontal bus bar 2 in the lateral direction of the horizontal bus bar 1 is limited to the range permitted by the clearance between the width of the groove, and the width of the blade 3q, and shift beyond such range is prevented.

Figure 7:
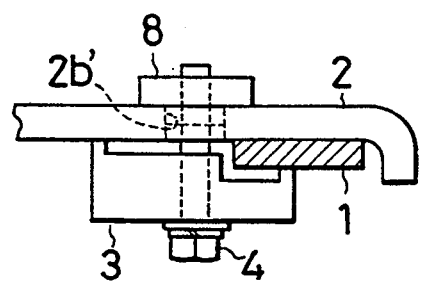
FIG. 7 is a plan view showing a bus bar connecting device of a further embodiment of the invention.
Figure 8:
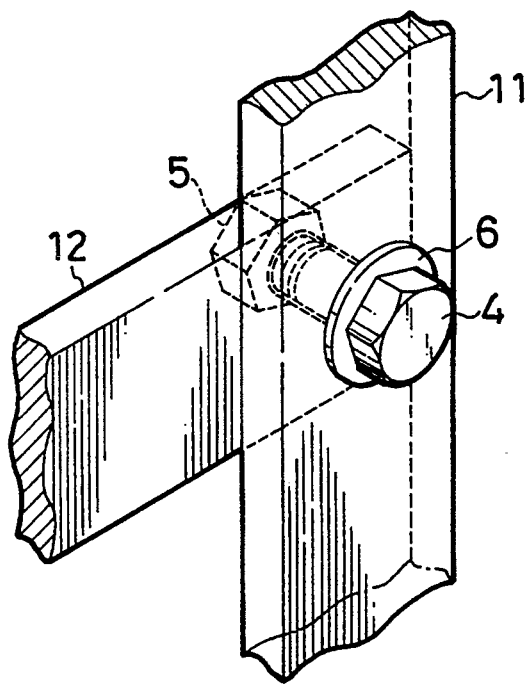
FIG. 8 is a perspective view showing a conventional bus bar connecting device.

FIG. 7 shows a modification of the clamper 3. A nut 8 used in place of the nut 5 of the embodiment of FIG. 1 to 4 is a large-sized, special, pressure-insertion type nut, and is pressured-inserted into a hole 2b' which has a larger diameter than the hole 2b of the embodiment of FIG. 1 to FIG. 4. The bolt 4 is inserted through the hole 3m and is then screwed into the nut 8 in the hole 2b'. With this arrangement, the nut 8 is fixed to the horizontal bus bar 2, so that it is not necessary to hold or rotate the nut 8 during assembly or screwing. Accordingly, the work of assembly or screwing is facilitated, and no space is need at the back of the horizontal bus bar for holding or rotating the nut 8.

In the embodiments described, the main bus bar 1 extends substantially vertically, and the branch bus bar 2 extends substantially horizontally. But the main and branch bus bars 1 and 2 may extend in other directions.

As has been described, according to the invention, a clamper is used, so the main bus bar need not be provided with a hole. When a new branch bus bar having a hole is added in an existing switchboard, the main bus bar existing in the switchboard need not be removed. Accordingly, the addition of the branch bus bar is easy, and the time and cost for remodeling or modification of the switchboard is reduced. Where the clamper is made of an electrically conductive material, the current can flow through the clamper. Where the clamper is provided with linear protrusions with which it is in contact with the bus bars, the area of contact is over linear areas, so that the contact pressure is high, and the area of contact is sufficient and a sufficient current capacity is obtained.

What is claimed is:

1. A bus bar connecting device comprising:
   a first bus bar;
   a second bus bar oriented at an angle with respect to said first bus bar, said second bus bar having a hole;
   a clamper for clamping the bus bars, and having a hole;
   a bolt inserted through the hole of the clamper and the hole in said second bus bar;
   a nut screwed with the bolt to press the clamper against the bus bars; and
   means for restricting shift of said second bus bar in a lateral direction of said first bus bar, said shift restricting means comprises a step formed on said clamper and engaging with a first side surface on the first bus bar, and an engaging member formed on said second bus bar and engaging with a second side surface of said first bus bar to restrict shift of said second bus bar in the lateral direction of said first bus bar.

2. The bus bar connecting device according to claim 1, wherein said clamper is made of an electrically conductive material.

3. The bus bar connecting device according to claim 2, wherein the clamper has linear protrusions at which it is in contact with the bus bars.

4. The bus bar connecting device according to claim 1, wherein said engaging member comprises a bent end of said second bus bar.

5. The bus bar connecting device according to claim 4, wherein said hole of said second bus bar is provided near said bent end so that said hole and said bent end are adjacent to opposite sides of said first bus bar.

6. The bus bar connecting device according to claim 1, wherein said engaging member comprises a protrusion provided on said second bus bar.

7. The bus bar connecting device according to claim 6, wherein said hole of said second bus bar is provided near said protrusion so that said hole and said protrusion are adjacent to opposite sides of said first bus bar.

8. The bus bar connecting device according to claim 1, wherein said nut is a pressure-insertion type nut and pressure-inserted in the hole of said second bus bar.

9. The bus bar connecting device according to claim 1, wherein said first bus bar is a main bus bar and said second bus bar is a branch bus bar.

10. The bus bar connecting device according to claim 9, wherein said first bus bar extends substantially vertically, and said second bus bar extends substantially horizontally.

11. The bus bar connecting device according to claim 1, wherein said clamper comprises:
a front surface;
a stepped rear surface opposite said front surface;
a top surface;
a bottom surface opposite said top surface;
a first side surface; and
a second side surface, wherein said top and bottom surfaces extend parallel with and are aligned with top and bottom surface of said second bus bar;
said first and second side surfaces extend parallel with first and second side surfaces of said first bus bar;
said stepped rear surface has a step in engagement with said second side surface of said first bus bar such that a first part of said rear surface is closer to said front surface than a second part of said rear surface and said clamper has a thin part defined by the first part of said rear surface and said front surface, and a thick part defined by the second part of the rear pan and said front surface.

12. The bus bar connecting device according to claim 11, wherein said clamper further comprises:
a first linear protrusion provided at an edge formed by said first side surface and the first part of said rear surface which protrudes rearward towards said first bus bar, said first linear protrusion being in contact with a front surface of said first bus bar; and
a second linear protrusion provided at an edge formed by said second side surface and the second part of said rear surface which protrudes rearward towards said second bus bar, said second linear protrusion being in contact with a front surface of said second bus bar.

13. A bus bar connecting device comprising;
a first bus bar;
a second bus bar oriented at an angle with respect to said first bus bar, said second bus bar having a hole;
a clamper for clamping the bus bars, and having a hole, said clamper having linear protrusions in contact with the bus bars,
a bolt inserted through the hole of the clamper and the hole in said second bus bar;
a nut screwed with the bolt to press the clamper against the bus bars;
means for restricting shift of said second bus bar in a lateral direction of said first bus bar, said shift restricting means comprising a groove provided on said first bus bar, with which one of the linear protrusions of said clamper is engaged.

14. The bus bar connecting device according to claim 13 wherein said clamper is made of an electrically conductive material.

15. The bus bar connecting device according to claim 13, wherein said first bus bar is a main bus bar and said second bus bar is a branch bus bar.

16. The bus bar connecting device according to claim 15, wherein said first bus bar extends substantially vertically, and said second bus bar extends substantially horizontally.

17. A bus bar connecting device comprising;
a first bus bar;
a second bus bar oriented at an angle with respect to said first bus bar, said second bus bar having a hole;
a clamper for clamping the bus bars, and having a hole, said clamper comprising;
a flat part of uniform thickness comprising a flat front surface and a flat rear surface opposing flat front surface; and
first and second blades extending from first and second edges of the flat part, wherein rear ends of said first and second blades form linear protrusions;
a bolt inserted through the hole of the clamper and the hole in said second bar; and
a nut screwed with the bolt to press the clamper against the bus bars;
wherein said first bus bar comprises an extending groove provided on a front surface thereof and extending in a vertical direction to receive the rear end of said first blade.

* * * * *